_United States Patent_ [19]

Braden

[11] Patent Number: 5,010,847
[45] Date of Patent: Apr. 30, 1991

[54] CALF FEEDER BOTTLE FOR DRY FEED

[75] Inventor: Joe T. Braden, Pickton, Tex.

[73] Assignee: Braden Industries, Pickton, Tex.

[21] Appl. No.: 439,956

[22] Filed: Nov. 21, 1989

[51] Int. Cl.⁵ .............................................. A01K 5/00
[52] U.S. Cl. ........................................ 119/18; 119/71
[58] Field of Search ................... 119/71, 72.5, 77, 18, 119/51.01; 215/11.1, 11.4; 222/490, 547

[56] References Cited

U.S. PATENT DOCUMENTS

| D. 249,076 | 8/1978 | Meeker et al. | 119/71 X |
|---|---|---|---|
| 811,870 | 2/1906 | Quittner | 119/18 |
| 2,065,012 | 12/1936 | Mulford | 248/318 |
| 2,455,848 | 12/1948 | Young | 119/71 X |
| 2,522,820 | 9/1950 | Haberkorn | 119/71 |
| 2,546,709 | 3/1951 | Abarr | 222/213 |
| 2,699,778 | 1/1953 | Ezell | 119/71 X |
| 3,139,064 | 6/1964 | Harle | 215/11.1 X |
| 3,726,436 | 4/1973 | Despain et al. | 222/213 |
| 3,938,769 | 2/1976 | Wetherbee | 222/181 X |
| 4,101,043 | 7/1978 | Johnson, Jr. et al. | 222/181 X |
| 4,793,533 | 12/1988 | Yang | 215/11.1 X |

FOREIGN PATENT DOCUMENTS

| 0063500 | 10/1891 | Fed. Rep. of Germany | 215/11.1 |
|---|---|---|---|
| 0554024 | 7/1932 | Fed. Rep. of Germany | 215/11.1 |
| 2227819 | 11/1974 | France | 119/77 |
| 0567265 | 10/1957 | Italy | 215/11.1 |
| 0594286 | 5/1959 | Italy | 215/11.1 |
| 0046777 | 4/1920 | Sweden | 215/11.1 |
| 1351549 | 11/1987 | U.S.S.R. | 119/17 |
| 1030036 | 5/1966 | United Kingdom | 215/11.1 |
| 2169210 | 7/1986 | United Kingdom | 215/11.4 |

Primary Examiner—Robert P. Swiatek
Assistant Examiner—Todd E. Manahan
Attorney, Agent, or Firm—Sughrue, Mion, Zinn, Macpeak & Seas

[57] ABSTRACT

A calf feeder bottle for dispensing dry feed has an angled neck portion which is in alignment with a handle on the front of the bottle and a bracket on the rear of the bottle so that a nipple secured to the mouth of the bottle when the bottle is in an inverted dispensing position will be angled properly for dispensing feed to a calf. The nipple has a tubular spout with a flap valve therein with the mating surfaces of the flap valve aligned with the handle to facilitate opening of the flap valve when the tubular portion of the nipple is squeezed by a calf.

5 Claims, 4 Drawing Sheets

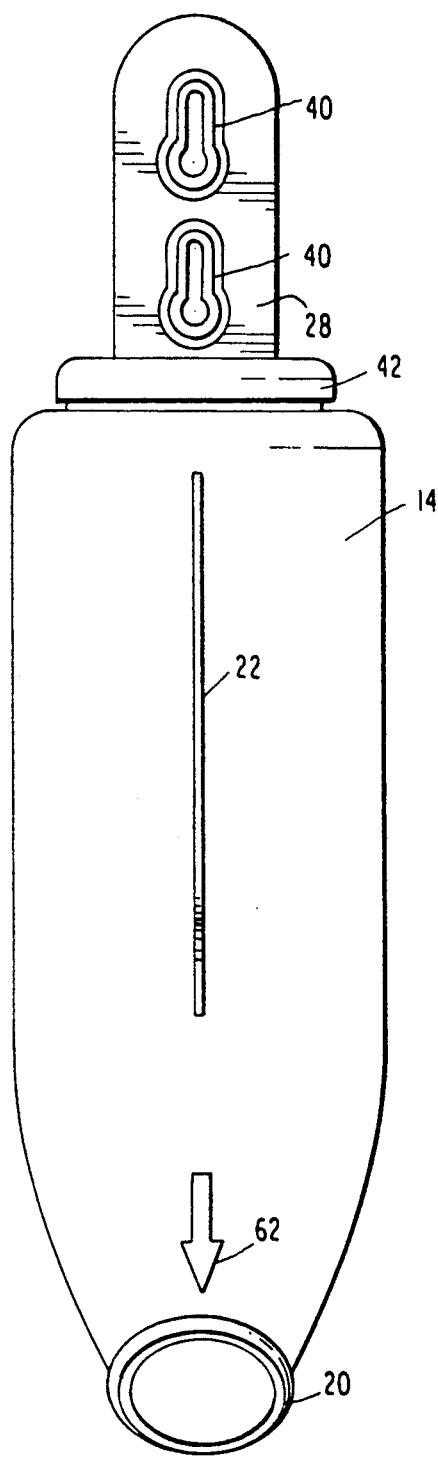
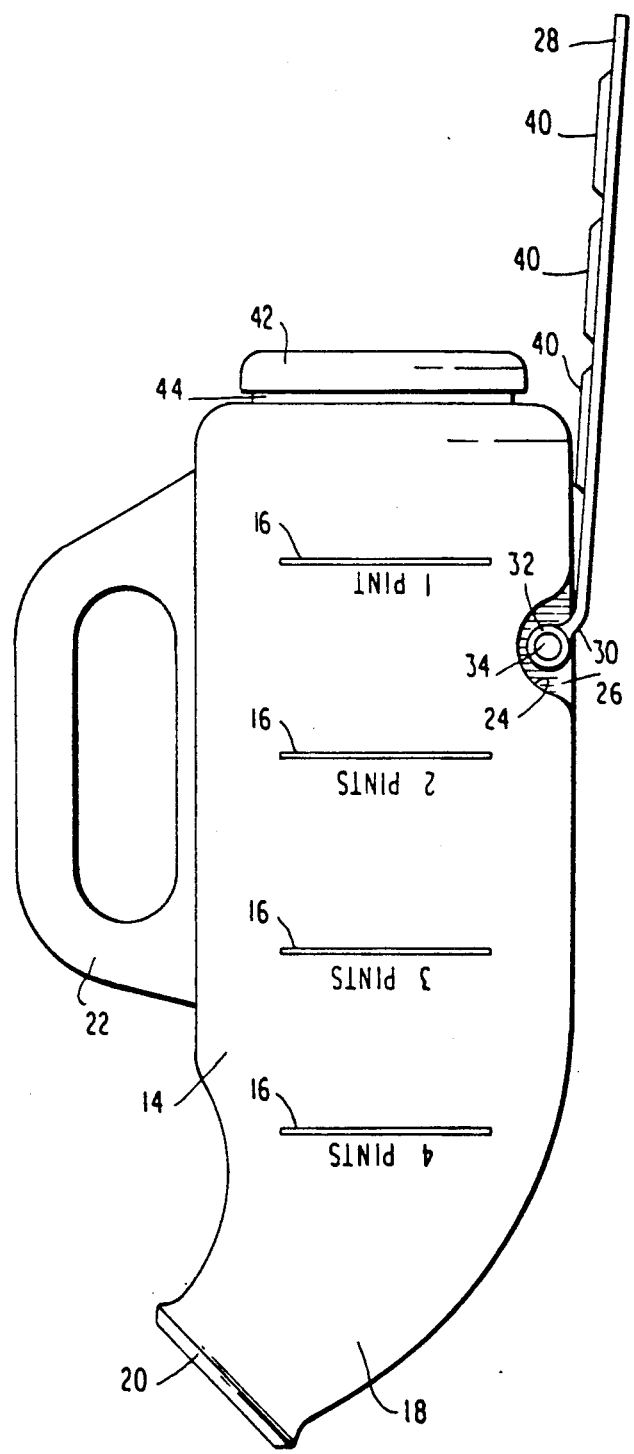
FIG. 1
FIG. 2

CALF FEEDER BOTTLE FOR DRY FEED

BACKGROUND OF THE INVENTION

The present invention is directed to a calf feeder bottle and more specifically to a bottle especially adapted to supply dry feed to a calf through a nipple having a flexible flap valve.

The use of nipples on a bottle which are especially designed for feeding a calf are old and well-known in the art as evidenced by the U.S. Pat. No. to Ezell - 2,699,778. However, the nipple disclosed in the Ezell patent is only suitable for use with a liquid feed.

The use of flexible flap valves for dispensing a semi-fluid or pasty material from a flexible squeeze-type container is also old and well-known in the art as evidenced by the U.S. Pat. No. to Abarr - 2,546,709 and the U.S. Pat. No. to Despain et al - 3,726,436. In the Abarr patent the flexible flap valve members are provided with pairs of opposed internal projections which define passages for the material being dispensed and which act as rocker members or fulcrums which cause the engaged flaps to separate on one side of the fulcrum when the body of the bottle is squeezed on the opposite side of the fulcrum. Such a self-closing tube would be totally unsuitable for dispensing dry feed to a calf since the calf would not be able to squeeze the body of the tube on the opposite side of the fulcrum to open the flap valve. The flap valve of Despain et al is also designed to operate when pressure is applied to the container rather than the valve and utilizes a complicated four-flap arrangement which would make the valve totally unsuitable for dispensing dry calf feed.

The use of holders to support a bottle in an inverted dispensing position is also well-known in the art as evidenced by the U.S. Pat. No. to Wetherbee - 3,938,769. In the Wetherbee patent the bottle holder is completely separate from the bottle. The bottle is provided with a cap having a dispensing tube adapted to dispense liquid to an animal when the bottle is in the inverted position.

The U.S. Pat. Nos. to Mulford - 2,065,012 and Johnson et al 4,101,043 each disclose a dispensing container having a support connected thereto for supporting the container in an inverted dispensing position. In Mulford a wire hook is slidably mounted on the outside of the bottle and is movable from a retracted position when the bottle is right side up to a projecting position when the bottle is inverted for dispensing. The patent to Johnson et al discloses a support clip which is slidably mounted in the bottom of a container which is movable to a projecting position for hanging the container in an inverted position from an adjacent support.

SUMMARY OF THE INVENTION

The present invention provides a new and improved calf feeder for dispensing dry feed to a calf. The calf feeder is so designed that the calf can start eating dry feed from the first day of life as opposed to the normal three-week period before a calf begins to eat dry feed. As a result, the calf is generally healthier and heavier than those on a purely liquid diet. The calf can be weaned sooner, bred younger and therefore start producing milk earlier.

The present invention provides a new and improved calf feeder comprised of a bottle of molded plastic material having a handle on one side and a support bracket pivotally mounted on the opposite side for supporting the bottle in an inverted dispensing position. said bottle having a curved neck at the lower end in the dispensing position, a nipple detachably secured to said neck and having the flap valve therein suitable for dispensing dry feed upon squeezing of the nipple by a calf. Alternatively, the bracket may be integrally molded with the bottle and the end of the bottle opposite the neck can be provided with a detachable cover to permit replenishment of the feed when the bottle is in the inverted dispensing position.

The foregoing and other objects, features and advantages of the invention will be apparent from the following more particular description of preferred embodiments of the invention as illustrated in the accompanying drawings.

BRIEF DESCRIPTION OF THE DRAWINGS

FIG. 1 is a front elevational view of the bottle in the inverted dispensing position with the nipple removed.

FIG. 2 is a side elevational view of the bottle shown in FIG. 1.

DETAILED DESCRIPTION OF THE INVENTION

Figure 3:
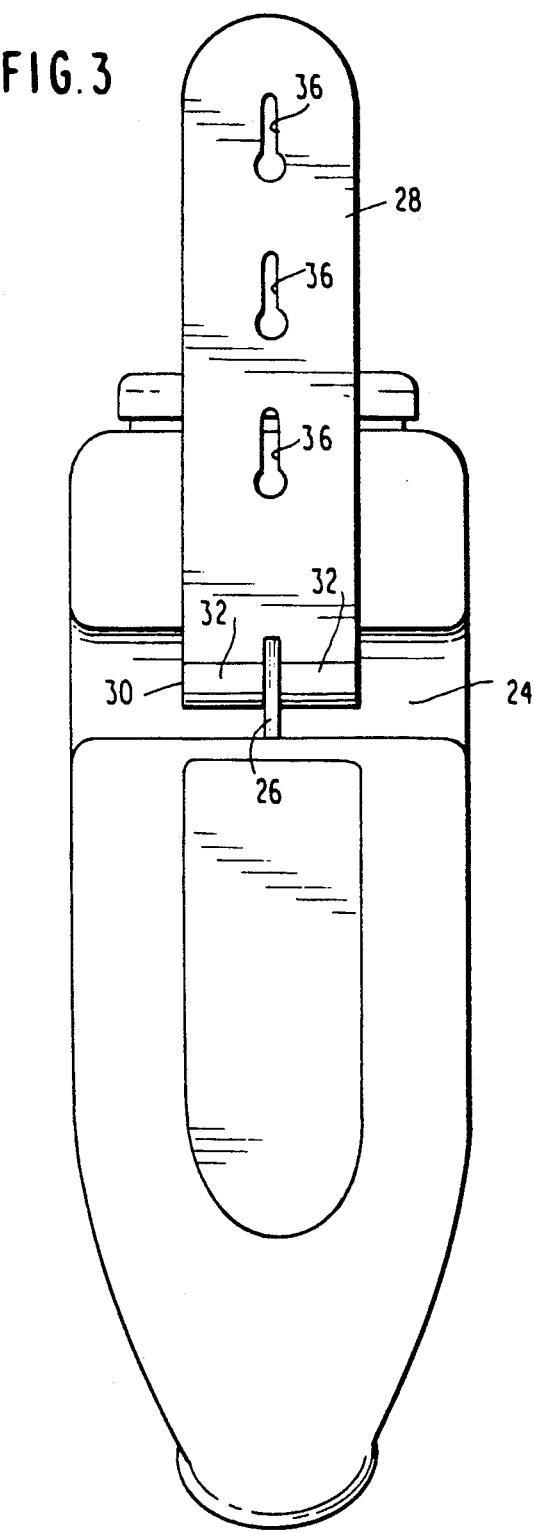
FIG. 3 is a rear elevational view of the bottle shown in FIG. 1.
Figure 4:
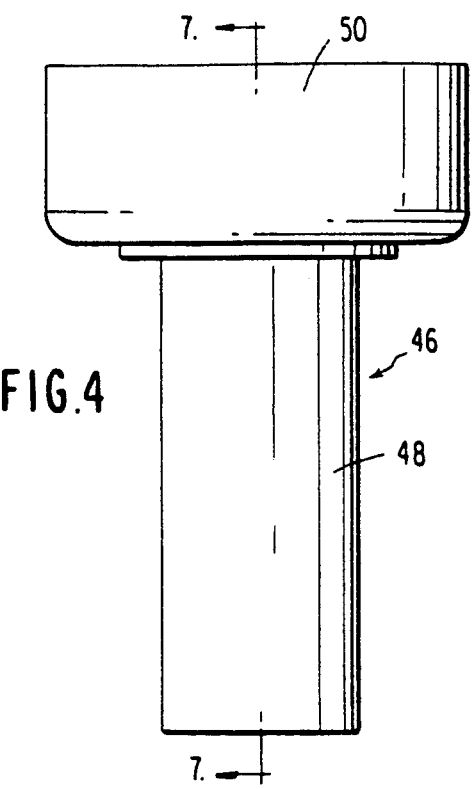
FIG. 4 is a side elevational view of the nipple as it would appear when attached to the bottle as viewed in FIG. 2.

The calf feeding bottle 14 as disclosed in the preferred embodiment of FIGS. 1-9 is preferably a two-quart bottle as indicated by the markings 16 in FIG. 2 but may be of any desirable size. Bottle 14 is provided with a curved neck portion 18 with the lower surface of the curved neck as viewed in FIG. 2 being a smooth continuation of the upper side of the bottle. The neck is provided with an enlarged lip portion 20 over which the nipple disclosed in FIGS. 4-9 inclusive can be snap-fitted. The handle 22 is integrally mounted on the front of the bottle so that the handle would be in alignment with the curved neck portion as best seen in FIGS. 1 and 2. On the rear surface of the bottle opposite the handle 22 a transverse recess 24 is formed having a longitudinally extending web portion 26 extending across the groove in the middle thereof in alignment with the handle 22. A support plate 28 is provided with an angled bifurcated portion 30 at the lower end thereof as viewed in FIGS. 2 and 3 with each bifurcation terminating in a tubular bearing member 32. A pin 34 is press-fitted or otherwise secured in the tubular bearing portions 32 and extends through an aligned aperture (not shown) in the web 26 so that the support bracket 28 will be pivotally mounted on the rear of the bottle 14. The support bracket 28 is provided with a plurality of vertically aligned keyhole slots 36 so that the bracket and the bottle attached thereto can be mounted at any suitable height on a headed nail or the like. Each keyhole slot 36 is provided on one side of the bracket 28 with a raised reinforcing edge portion 40.

A cover 42 may be detachably connected to the flange 44 surrounding an opening in the end of the bottle 14 opposite the neck 18 to facilitate refilling of the bottle when the bottle is supported in the inverted dispensing position as shown in FIG. 2. The cover 42 may be snap fitted to the flange 44 similar to the manner in which the nipple is attached to the flange 20 on the neck of the bottle or the cover and flange may be provided with complementary screw threads.

Figure 9:
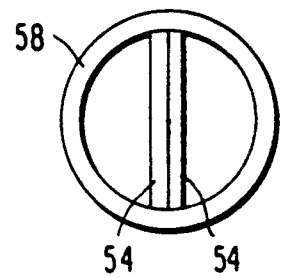
FIG. 9 is an end view of the nipple as viewed in FIG. 6 with the flap valve in the closed position.
Figure 10:
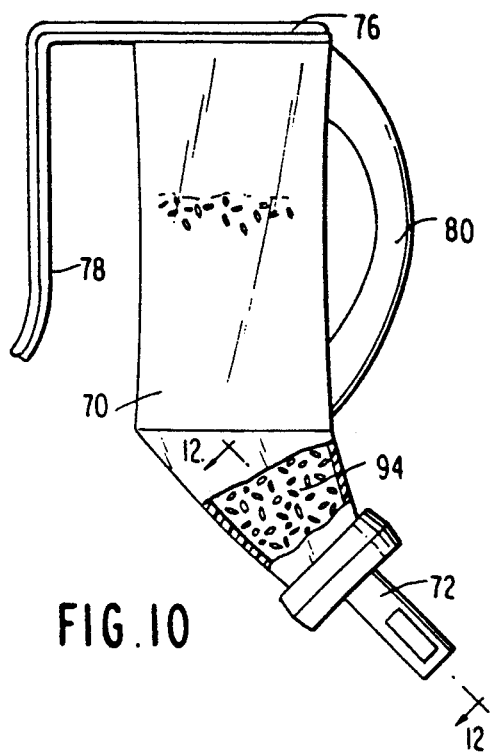
FIG. 10 is a side elevational view of a modified calf feeding bottle according to the present invention.

The nipple assembly 46 for the bottle 14 is comprised of a tubular portion 48 having a larger diameter flange portion 50 with an annular internal bead 52 disposed adjacent the open end thereof which is adapted to be snap fitted over the flange 20 on the neck 18 of the bottle shown in FIGS. 1-3. The tubular portion 48 is provided with a pair of integrally mounted flaps 54 which are symmetrically disposed with respect to the axis 56 of the tubular portion 48 at an angle of 20°. The entire nipple assembly 46 including the flange 50, the tubular portion 48 and the flaps 54 may be molded as a single piece from a flexible resilient material such as rubber, plastic or any other suitable material. The flaps 54 extend diametrically across the open end 58 of the tubular portion 48 as best seen in FIG. 9 to provide a normally closed valve structure for the nipple.

Figure 5:
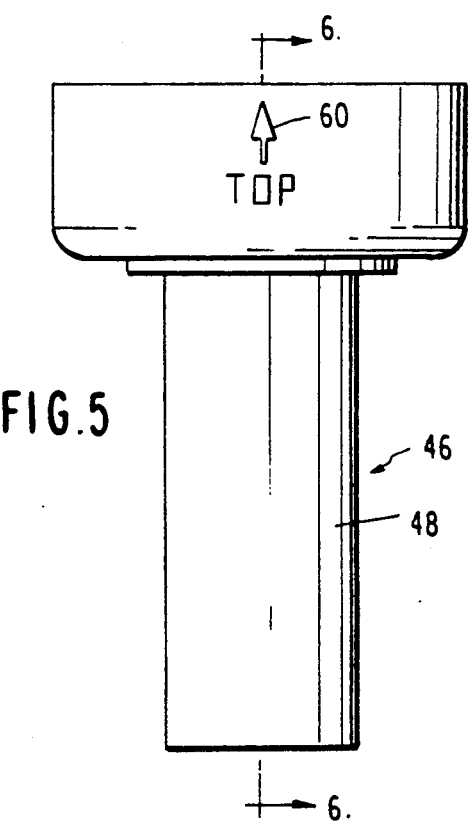
FIG. 5 is a front elevational view of the nipple as it would appear when attached to the bottle as viewed in FIG. 1.
Figure 6:
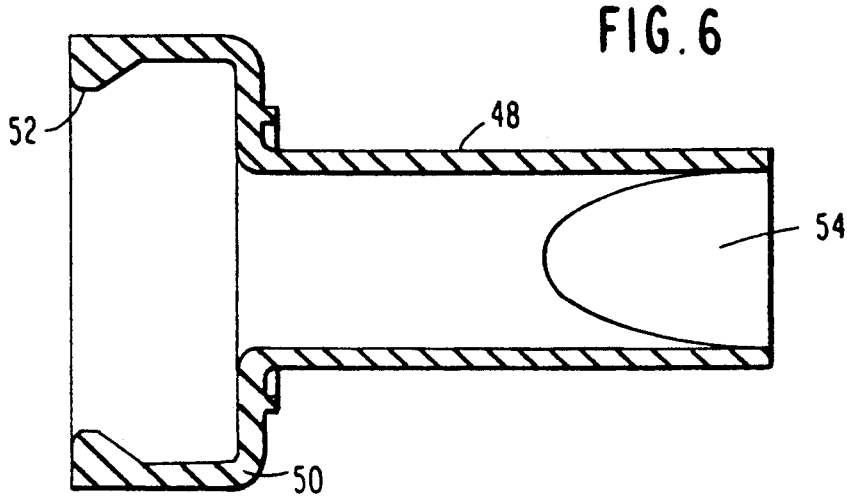
FIG. 6 is a sectional view taken along the line A—A in FIG. 5.
Figure 7:
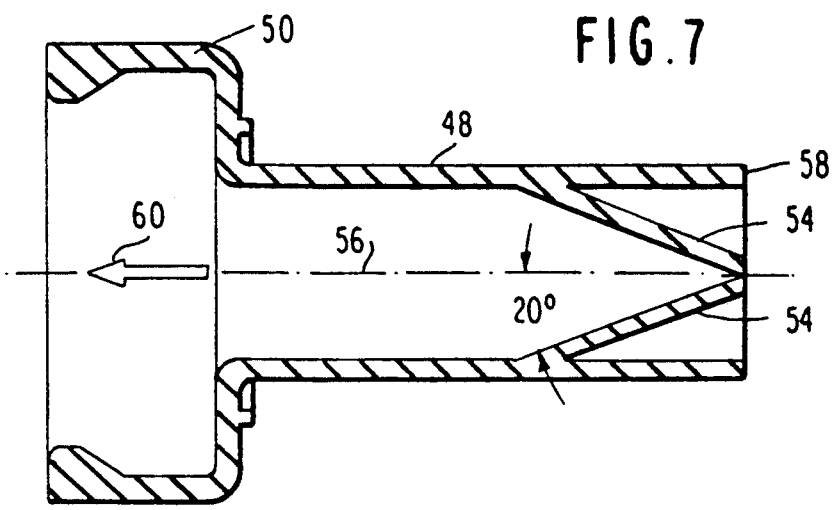
FIG. 7 is a sectional view taken along the line B—B in FIG. 4.
Figure 8:
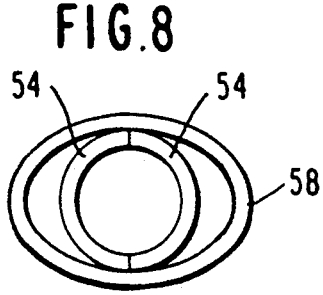
FIG. 8 is an end view of the nipple as viewed from the right in FIG. 6 with the flap valve in the open position.

When assembling the nipple on the neck of the bottle. the arrow 60 on the nipple assembly 46 as shown in FIG. 5 should be aligned with the arrow 62 on the bottle as shown in FIG. 1. With the nipple and bottle in this specific alignment the flaps 54 of the flap valve will be disposed in vertical alignment with the handle 22 on the bottle. Due to the curvature of the neck 18 the calf would always approach the bottle on the handle side thereof and upon squeezing the tubular portion 48 of the nipple, the flaps 54 of the flap valve would move to the opened position as shown in FIG. 8 thereby permitting the dispensing of dry feed material from the bottle to the calf.

Figure 11:
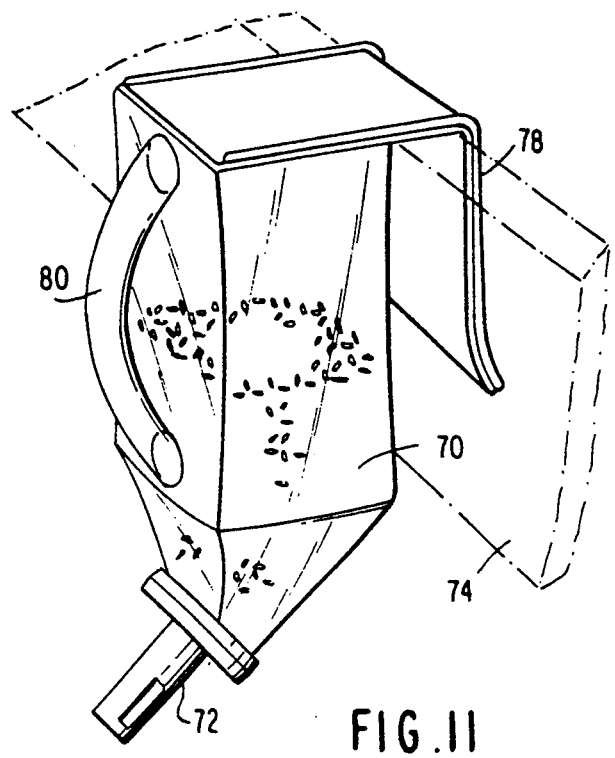
FIG. 11 is a perspective view of the modified bottle shown in FIG. 10.
Figure 12:
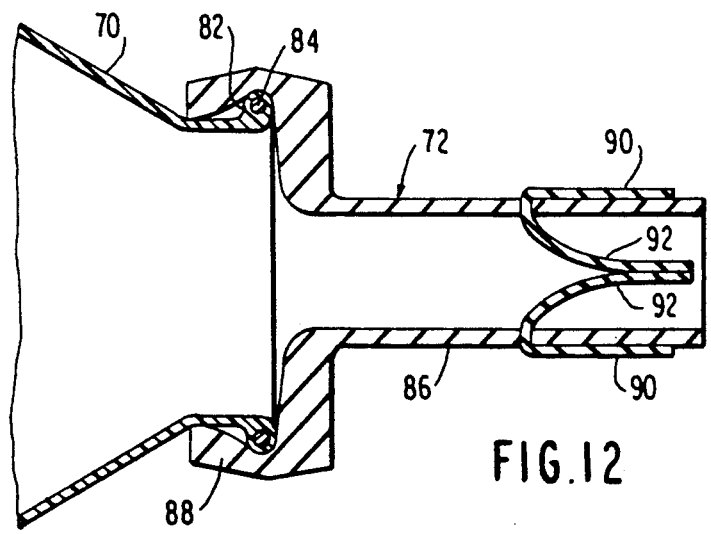
FIG. 12 is a sectional view taken along the line C—C in FIG. 10.
Figure 13:
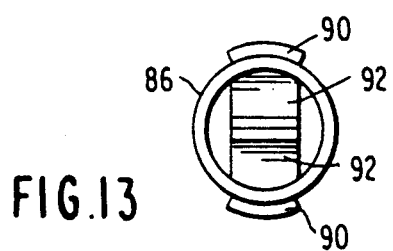
FIG. 13 is an end view of the nipple as viewed from the right in FIG. 12.

A modified form of dispensing bottle and nipple is disclosed in the embodiment of FIGS. 10-13. The bottle 70, the handle 80 and the support bracket 78 may be molded in integral one-piece construction from a clear flexible plastic material so that the contents of the bottle are readily visible. The suitable stiffening bracket or support blade 76 may be molded within in the bracket 78 to provide a more rigid support structure for the bottle when the bottle is hung on a board 74 as shown in FIG. 11. The bottle 70 is provided with an outwardly extending flange 82 haVing a reinforcing member 84 therein.

The nipple 72 may be molded of any suitable flexible resilient material such as rubber, plastic or the like and is comprised of a large tubular portion 86 and the larger diameter flange portion 88 adapted to be snap-fitted over the flange 82 on the neck of the bottle 70. A pair of flexible resilient tabs 90 ar secured on the outer surface of the tubular portion 86 directly opposite each other and extend through slots to the interior of the bottle where the tabs define flexible resilient flaps 92 disposed in engagement with each other. The flaps 92 do not have to completely close the tubular opening since the dry feed is usually in the form of large pellets 94 which would not normally pass through the flap valve when disposed in the position shown in FIG. 12. As the calf sucks the tubular portion of the nipple, the flap valves will separate due to physical pressure as well as suction applied by the calf so that the dry feed will readily be dispensed to the calf.

While the invention has been particularly shown and described with reference to preferred embodiments thereof, it will be understood by those in the art that the foregoing and other changes in form and details may be made therein without departing from the spirit and scope of the invention.

What is claimed is:

1. A calf feeder bottle for dry feed comprising a bottle having a curved neck portion at one end thereof curved toward one side of said bottle, support means pivotally connected to said bottle on a side opposite said one side for supporting the bottle in an inverted position with the neck portion disposed downwardly and nipple means detachably connected to said neck portion and including flap valve means therein normally closing said nipple means while permitting dispensing of dry feed upon application of pressure to said nipple means.

2. A bottle feeder as set forth in claim 1, wherein said nipple means is comprised of a hollow tubular portion and said flap valve means is comprised of a pair of internal flaps integrally molded in one piece with said tubular portion directly opposite each other within said tubular portion and in separable engagement with each other.

3. A bottle feeder as set forth in claim 2, wherein said bottle is provided with handle means disposed on said one side of said bottle in alignment with said curved neck portion.

4. A bottle feeder as set forth in claim 3, wherein said support means is comprised of a flat plate pivotally mounted on said bottle and having a plurality of apertures therein for engagement with a suitable support.

5. A bottle feeder as set forth in claim 3, wherein said bottle is provided with indicia means on the neck portion thereof in alignment with said handle means and said nipple means is provided with complementarily indicia means on an external surface thereof in alignment with said engaged flaps so that upon alignment of said indicia means on said bottle and said nipple means the value means will be properly oriented for dispensing dry feed to a calf.

* * * * *